No. 882,141. PATENTED MAR. 17, 1908.
T. COPE.
CABLE INSULATING AND TESTING SYSTEM.
APPLICATION FILED JUNE 30, 1906.
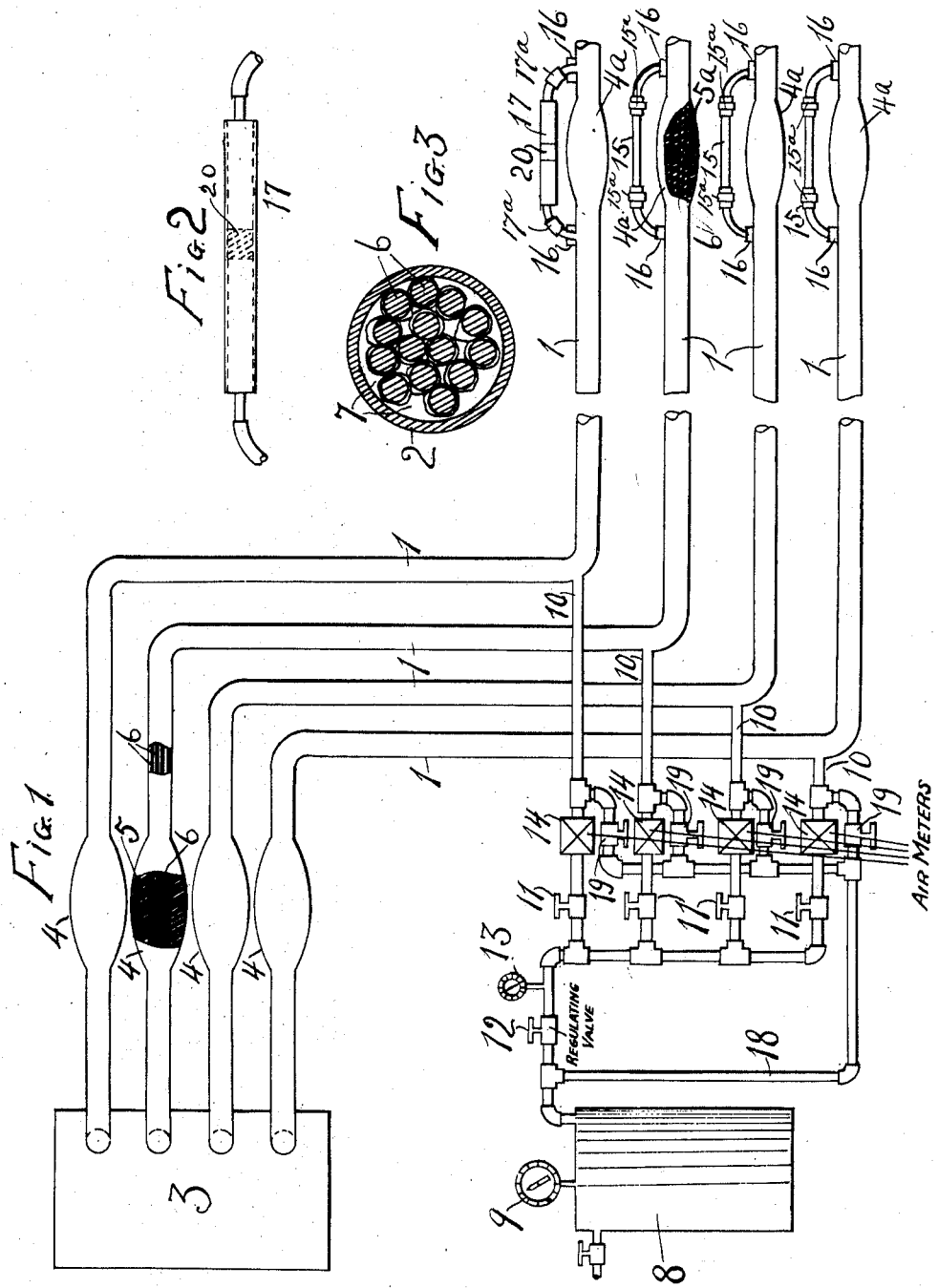
WITNESSES: Troy Cope INVENTOR.
BY
ATTORNEY.

UNITED STATES PATENT OFFICE.

TROY COPE, OF NEW WATERFORD, OHIO.

CABLE INSULATING AND TESTING SYSTEM.

No. 882,141.　　　Specification of Letters Patent.　　　Patented March 17, 1908.

Application filed June 30, 1906. Serial No. 324,136.

*To all whom it may concern:*

Be it known that I, TROY COPE, a citizen of the United States, residing at New Waterford, in the county of Columbiana and State of Ohio, have invented certain new and useful Improvements in Cable Insulating and Testing Systems, of which the following is a specification.

My invention relates to cables for the conducting of electric currents and particularly to that class of electric cables used in telephone and telegraph systems which are provided with an external sheath or covering of lead or other metal, and which have between the several wires comprising the cable more or less air space or voids due to the loose wrapping of the insulation on said bundles of wires, and which are known generally in the art as dry core cables.

The objects of my invention are to maintain a high degree of insulation in the wires composing the cable and to provide a convenient and accurate means of detecting and locating leaks and breakdowns in the cable sheathing.

My device is designed for use with a system of cables having metal or other sheathing impervious, in its normal state, to the passage of air and having air or gas introduced through suitable inlets into said cable and filling the voids between the wires of the cable, the said air or other gas being at a higher pressure than the atmosphere surrounding the cable.

In practical telephone or telegraph dry core cable construction, at the joints in said cables where the wires are spliced, the voids which would otherwise exist between the wires within the metal sheath are liable to, and actually do, become filled and clogged by the insulating compound which is applied in a liquid or plastic state, and which upon hardening, interrupts the continuity of the air passages. This defect I also aim to remedy by my invention as will be more particularly described hereinafter.

In the accompanying drawings which form part of this specification:—Figure 1 represents a diagrammatic view of a section of a cable system showing the means for introducing the air pressure within the cables. Fig. 2 represents an indicating device for insertion at the by-passes in the cables. Fig. 3 represents a cross section of a metal sheathed cable to illustrate the voids therein.

Referring again to the drawings:—1—1 are cables having the metal sheath 2 and ending at the terminal board 3. The joints 4—4 adjacent to the terminal board are filled with suitable insulating compound as shown at 5 completely filling the spaces between the wires 6—6 and preventing escape of air at the ends of the cables. The cross section of cable represented in Fig. 3 clearly shows the wires 6 having loosely wrapped paper or other hygroscopic insulating material, the metal sheath 2 and the voids 7 between the wires.

$4^a$—$4^a$ indicate splicing joints which may occur in the length of the cables and which may also represent a repaired breakdown occurring in the circuit and shows how the voids are filled with insulating compound $5^a$, completely filling the voids at these points and interrupting the continuity of the said voids as passages for air along and within the cables.

Air or gas under pressure contained in a suitable reservoir 8 having a pressure gage 9 is introduced into the several cables by means of the tubes 10—10, having cocks 11—11. A regulating valve 12 reduces the air to the desired pressure which is indicated by the gage 13. Meters or other indicating devices 14—14 are inserted in the lines 10—10 to register the quantity of air passing into each cable and serve to immediately detect any leak in its cable when the quantity of air passing is above the normal.

In practice it is the custom in repairing breakdowns occurring in the cable, to insert within the metallic sheath some insulating compound in a liquid or plastic state at the defective point, which surrounds the wires and fills the voids and interstices in the cable and which upon hardening interrupts the continuity of the cable for the passage of the air or other gas through said cable. At the joints in the cable or where the cable is repaired and the continuity of the voids is interrupted, I therefore, provide the by-pass tubes 15—15 which are inserted into the metallic sheath of the cable to give continuity thereto and detachable connections 16—16 for the insertion of the indicator 17. Flexible connections $17^a$ are provided on the indicator 17 for effecting its connection in the by-pass tubes 15, and unions $15^a$ are provided in said by-pass tubes 15 to open said tubes for the insertion of the said indicator 17. A leak having been indicated by the registers 14, or by any other means, a high pressure by-pass line 18 connected from the air supply 8 to the several cables is connected by means of its particular cock 19 to the cable in which the leak is to be located, the low pressure cock 11 for that particular cable having been shut off. The leak is then found by the inspector as he passes along the length of the defective section of cable, the hissing noise of the escaping air through the leak enabling said leak to be located approximately and the exact spot to be then found by the inspector passing his hand along the cable in the vicinity of the hissing noise, the defective section of cable having been first determined by the indicator as described below.

For routine inspection, the indicator 17 which consists preferably of a short transparent tube having a light disk 20 therein is connected successively in the by-passes of successive joints, starting at the first section of cable. If this section is sound the disk 20 will be driven towards the farther end of the tube, but if the leak be in that section, the disk will remain practically stationary for the reason that the air is escaping at some point before reaching the indicator tube 17. The same steps are taken at the by-pass connections of the succeeding section, and so on until the leak, if any, be found. For convenience, if the joints are too far apart, the cables may be divided up into smaller testing sections by opening the metal sheathing at determined intervals and inserting insulating compound to break the continuity of the air passages at these points.

Having thus described my invention, I claim as new:—

1. In a system for locating leaks in dry core cables, the combination with a plurality of metal sheathed cables having voids for the passage of air or gas between the wires of the said cable, means for introducing air or gas under pressure into said voids of each cable, and means for indicating the quantity of air or gas passing into each of said cables, of solid sectional air tight interruptions of said voids at intervals in said cables, by-pass tubes around said sectional interruptions, and an indicator to be inserted successively in each of said by-pass tubes, substantially as described and for the purpose set forth.

2. In a system of the class described, the combination with a plurality of dry core cables containing air or gas under pressure and having meters to indicate the quantity of air or gas passing into each of said cables, and by-pass tubes at the joints of said cables, of independent means for introducing higher pressure into any one cable, substantially as and for the purpose set forth.

In testimony whereof I have affixed my signature in presence of two witnesses.

TROY COPE.

Witnesses:
C. LUDLOW LIVINGSTON,
JAS. L. CAMERON.